United States Patent [19]

Takeuchi

[11] Patent Number: 4,898,024
[45] Date of Patent: Feb. 6, 1990

[54] PIEZOELECTRIC PRESSURE MEASURING INSTRUMENT

[75] Inventor: Kiyoshi Takeuchi, Yokohama, Japan
[73] Assignee: Nissan Motor Co., Ltd., Yokohama, Japan
[21] Appl. No.: 192,944
[22] Filed: May 12, 1988

[30] Foreign Application Priority Data

May 22, 1987 [JP] Japan ............................ 62-76050[U]
May 29, 1987 [JP] Japan ............................ 62-81045[U]
Jun. 2, 1987 [JP] Japan ............................ 62-85521[U]

[51] Int. Cl.$^4$ ........................ G01L 9/08; G01M 15/00
[52] U.S. Cl. ........................................ 73/115; 73/714;
73/754; 73/761; 73/DIG. 4; 310/338
[58] Field of Search ................... 73/115, DIG. 4, 761,
73/754, 714; 310/338

[56] References Cited

U.S. PATENT DOCUMENTS

| 2,773,388 | 12/1956 | Prosser | 73/431 |
| 3,505,862 | 4/1970 | List et al. | 73/115 |
| 4,566,316 | 1/1986 | Takeuchi | 73/115 |
| 4,602,506 | 7/1986 | Sawamoto et al. | 73/115 |
| 4,686,861 | 8/1987 | Morii | 73/115 |

FOREIGN PATENT DOCUMENTS

| 41-5154 | 3/1966 | Japan . |
| 59-108244 | 7/1984 | Japan . |
| 61-14343 | 1/1986 | Japan . |
| 61-14344 | 1/1986 | Japan . |
| 61-14345 | 1/1986 | Japan . |
| 61-118635 | 6/1986 | Japan . |

Primary Examiner—Donald O. Woodiel
Attorney, Agent, or Firm—Foley & Lardner, Schwartz, Jeffery, Schwaab, Mack, Blumenthal & Evans

[57] ABSTRACT

A pressure measuring instrument for the measurement of the combustion chamber pressure in a cylinder of an internal combustion engine, comprises a piezoelectric pressure sensor. The sensor includes an annular disk-like electrode with an output terminal, a piezoelectric element in contact with said electrode, a pair of annular pressure acting members having interposed therebetween said electrode and said piezoelectric element, and a lead. The piezoelectric pressure sensor is disposed between a first wall on a cylinder head and a second wall of a spark plug.

20 Claims, 13 Drawing Sheets

PIEZOELECTRIC PRESSURE MEASURING INSTRUMENT

BACKGROUND OF THE INVENTION

The present invention relates to a pressure measuring instrument, and more particularly to a piezoelectric pressure measuring instrument.

An object of the present invention is to provide a pressure measuring instrument for the measurement of the combustion chamber pressure in a cylinder of an internal combustion engine which is easy to install between a first wall extending radially outward from one axial end of a spark plug insert bore formed through an engine cylinder head and a second radially extending wall of a spark plug threadedly engaged in the spark plug insert bore.

SUMMARY OF THE INVENTION

According to the present invention, a pressure measuring instrument is provided for the measurement of the combustion chamber pressure in a cylinder of an internal combustion engine. The pressure measuring instrument comprises:

a cylinder head formed with a spark plug insert bore with a female thread, said cylinder head including a first wall extending radially outwardly from one axial end of said spark plug insert bore;

a spark plug including a portion with a male thread screwed into said female thread of said spark plug insert bore, and a second radially extending wall opposed to and spaced from said first wall of said cylinder head;

a piezoelectric pressure sensor surrounding said portion of said spark plug and disposed between said first and second walls;

said sensor comprising an annular disk-like electrode with an output terminal, a piezoelectric element disposed on said electrode, a pair of annular pressure acting members having interposed therebetween said electrode and said piezoelectric element, and a lead;

one of said pair of annular pressure acting members having an axially extending wall disposed inward of the inner periphery of the other of said pair of annular pressure acting members; and a gasket disposed between said first and second radially extending walls.

In one form of the present invention, the gasket is disposed radially outward of the axially extending wall and on the other of the pair of annular pressure acting members, the axially extending wall is curved radially outward to form a terminal end portion holding the gasket on the other of the pair of annular pressure acting members, and the one of the pair of annular pressure acting members is in abutting engagement with one of the first and second walls with the terminal end portion being in abutting engagement with the other of the first and second walls.

Specifically, a pressure measuring instrument according to the present invention comprises an arrangement wherein the other of the pair of pressure acting members has a mast core portion, and the mast core portion of the other of the pair of pressure acting members has a sleeve surrounding a connection where said connection where the output terminal of the electrode is connected to the lead.

Specifically, the gasket has a radial extension formed with a slot receiving therein the mast core portion of the other of the pair of pressure acting members.

Specifically, one of the pair of pressure acting members has an elongate sleeve enclosing the lead, and a resilient plate is fixed to the elongate sleeve.

Specifically, a pressure measuring instrument according to the present invention includes an annular insulator disk having an integral collar. The annular disk is disposed between the electrode and the other of the pair of pressure acting members with its integral collar positioned between the axially extending wall and the inner peripheries of the electrode and the piezoelectric element.

DESCRIPTION OF THE PREFERRED EMBODIMENTS

Figure 1:
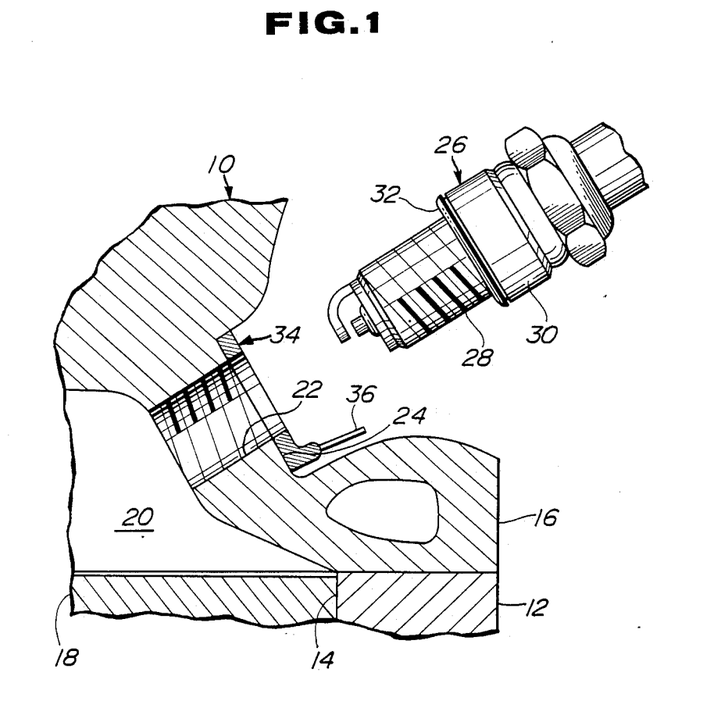
FIG. 1 is a fragmentary sectional view of an internal combustion engine with a spark plug removed and a piezoelectric pressure sensor positioned in place.
Figure 3:
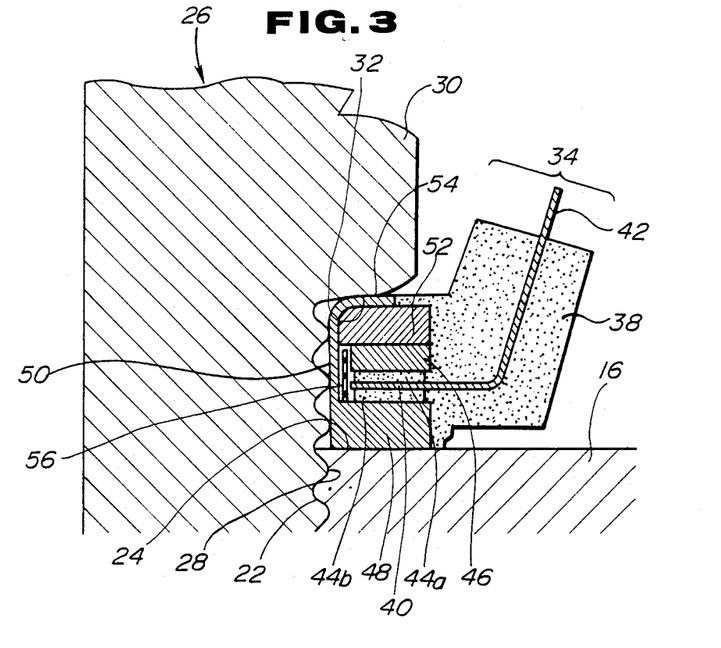
FIG. 3 is a fragmentary sectional view of an internal combustion engine with the piezoelectric pressure sensor in its operative position.

Referring to FIG. 1, there is shown a portion of an internal combustion engine 10 including an engine block 12 formed with a plurality of cylinders, only one being shown at 14, and a cylinder head 16. Slidably disposed in the cylinder 14 is a piston 18 to define a combustion chamber 20 between the cylinder 14 and the cylinder head 16. The cylinder head 16 is formed with a spark plug insert bore 22 formed with a female thread. The cylinder head 16 includes a first substantially flat wall 24 extending radially outward from an outer axial end of the spark plug insert bore 22. Also shown is a spark plug 26 which includes a portion 28 formed with a male thread adapted to be threadedly engaged with the female thread of the spark plug insert bore 22. The spark plug 26 also includes a radially extending flange 30 formed with a second radially extending wall 32. This second radially extending wall 32 is opposed to and spaced from the first radially extending wall 24 when the spark plug 26 is screwed into the spark plug insert bore 22. A flat ring shaped piezoelectric pressure sensor 34 is disposed on the first radially extending wall 24. As best seen in FIG. 3, when the spark plug 26 is screwed into the spark plug insert bore 22, the piezoelectric pressure sensor 34 surrounds the male thread portion 28 of the spark plug 26 and disposed between the first and second radially extending walls 24, 32. In its operative position as shown in FIG. 3, the sensor 34 is subject to a compression force because the spark plug 26 is screwed tightly into the spark plug insert bore 22. This compression force decreases as the combustion chamber pressure in the combustion chamber 20 increases. With the piezoelectric sensor 34, this compression force is converted into an electric signal which is taken out via an electric signal transmitter in the form of a lead 36. Thus, the combustion chamber pressure is measured in terms of an electric signal.

Figure 2:
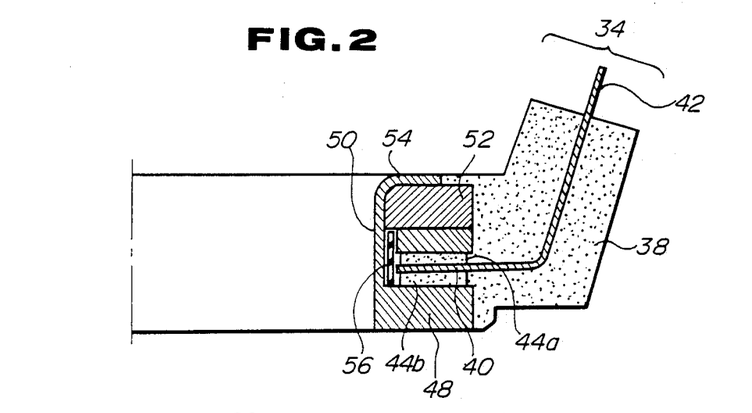
FIG. 2 is a fragmentary sectional view of a first embodiment of a pressure sensor.

Referring particularly to FIGS. 2 and 3, the sensor 34 comprises an annular molded body 38 made of an insulator, an annular disk-like electrode 40 with an output terminal 42. The electrode 40 is interposed between a first piezoelectric element 44a and a second piezoelectric element 44b. A pair of annular pressure acting members 46 and 48 are disposed in such a manner as to interpose therebetween the first and second piezoelectric elements 44a and 44b. In order to protect the inner peripheries of the electrode 40 and piezoelectric elements 44a, 44b, the pressure acting member 48 has an axially extending wall 50 disposed radially inward of the inner periphery of the other pressure acting member 46. In order to prevent the electrode 40 from contacting the axially extending wall 50, an insulator collar 56 is fit around the axially extending wall 50. An annular gasket 52 is disposed radially outwardly of the axially extending wall 50 and is fitted on the pressure acting member 46. To avoid direct contact of the gasket 52 with the second radially extending wall 32 of the spark plug 26, the axially extending wall 50 is curved radially outward to form a terminal end portion 54, thus holding the gasket 52 on the annular pressure acting member 46. As will be appreciated from FIG. 3, the pressure acting member 48 is in abutting engagement with the first wall 24 of the cylinder head 16 with its terminal end portion 54 in abutting engagement with the second wall 32 of the spark plug 26. With this arrangement, the pressure acting member 48 is subject to a torque upon tightening of the spark plug 26, thus reducing the transmission of torque to the gasket 52, pressure acting member 46, piezoelectric elements 44a, 44b, and electrode 40. Thus, the spark plug 26 can be tightened with a sufficiently great torque without any concern for damage of the sensor components. As a result, a great improvement has been made in installability of the piezoelectric pressure sensor 34.

Figure 4:
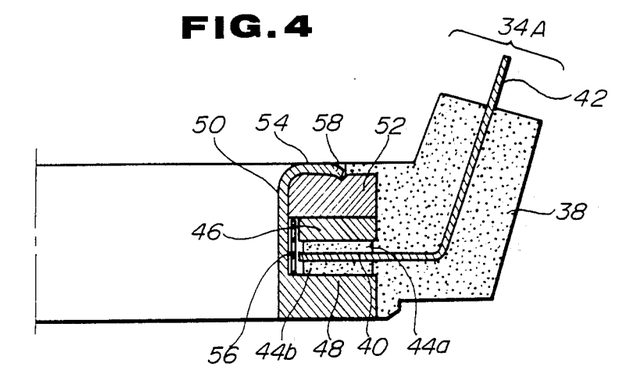
FIG. 4 is a fragmentary sectional view of a second embodiment of a piezoelectric pressure sensor.

Preferably, as shown in FIG. 4, a terminal end portion 54 should be in locking engagement with a gasket 52 in order to prevent a relative rotation between a pressure acting member 48 and the gasket 52 during tightening operation of a spark plug 26. For this locking engagement, a plurality of portions on the periphery of the terminal end portion 54 firmly engage into the gasket 52, only one portion of which is shown at 58 in FIG. 4. Thus, according to the structure of a piezoelectric sensor 34A shown in FIG. 4, a relative rotational movement among the sensor components is completely prevented or at least minimized.

Figure 5:
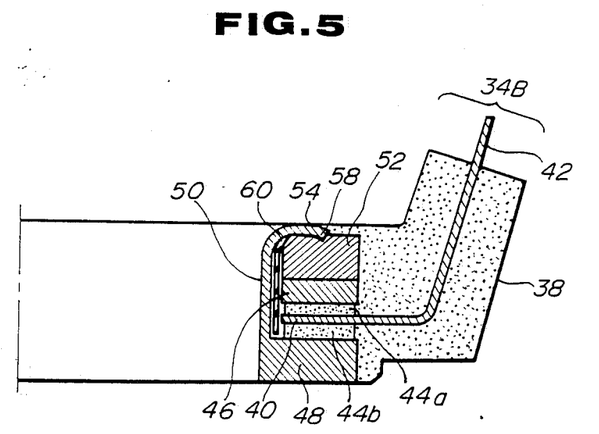
FIG. 5 is a fragmentary sectional view of a third embodiment of a piezoelectric pressure sensor.

Preferably, as shown in FIG. 5, a relatively long insulator collar 60 should be used to make it easy to secure insulation between the inner periphery of an electrode 40 and an axially extending wall 50 of a pressure acting member 48. This insulator collar 60 is as high as the top of a gasket 52 when the gasket 52 is disposed on a pressure acting member 46 lying on a piezoelectric element 44a before the axially extending wall 50 is curved radially outward to form a terminal end portion 54. According to the structure of a piezoelectric pressure sensor 34B, with the upper end portion of the collar 60 interposed between the axially extending wall 50 and the gasket 52, the axially extending wall 50 is curved to form the terminal end portion 54 to lock the insulator collar 60 in the appropriate position for insulation of a space between the axially extending wall 50 and the inner periphery of the electrode 40.

Figure 6:
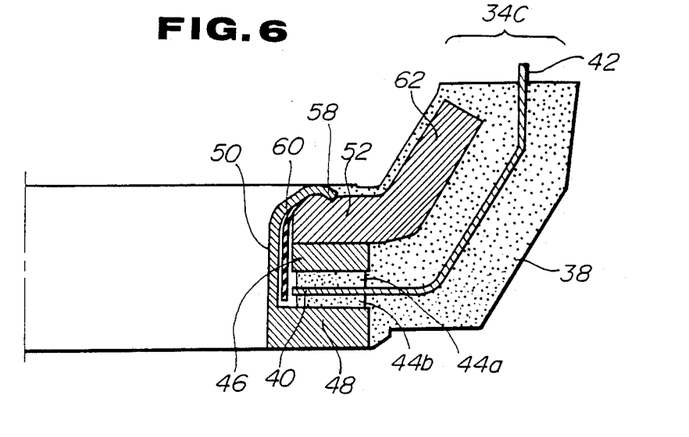
FIG. 6 is a fragmentary sectional view of a fourth embodiment of a piezoelectric pressure sensor.

Preferably, as shown in FIG. 6, a gasket 52 with a protrusion 62 should be used. This protrusion 62 extends in the same direction as an output terminal 42 from electrode 40, so that it serves as an indicator upon tightening a spark plug 26.

Figure 7:
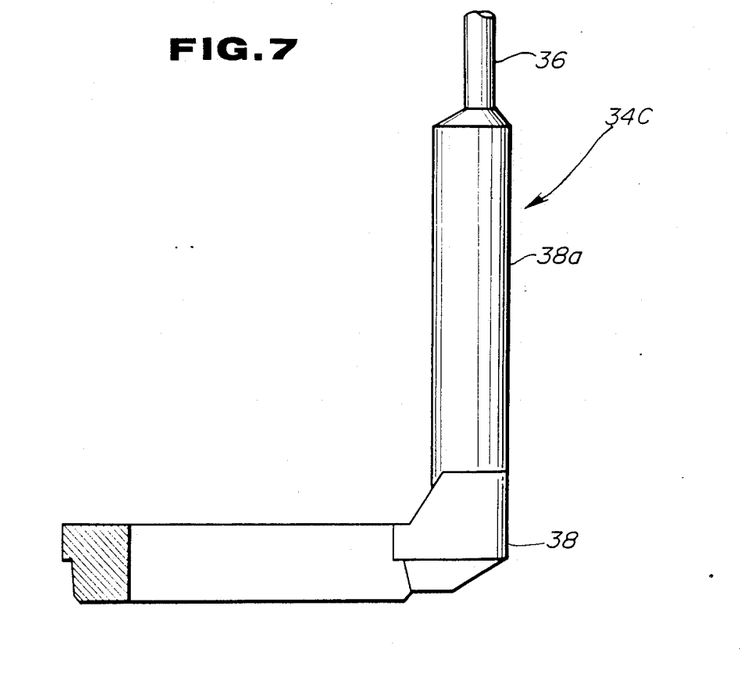
FIG. 7 is a side elevation, partly sectioned, of the fourth embodiment.

FIG. 7 shows, in reduced dimension, a piezoelectric pressure sensor 34C shown in FIG. 6. As shown in FIG. 7, an annular insulator body 38 has a mast section 38a extending axially to enclose a connection where the output terminal 42 is connected to an output lead in the form of a shielded cable 36.

Figure 8:
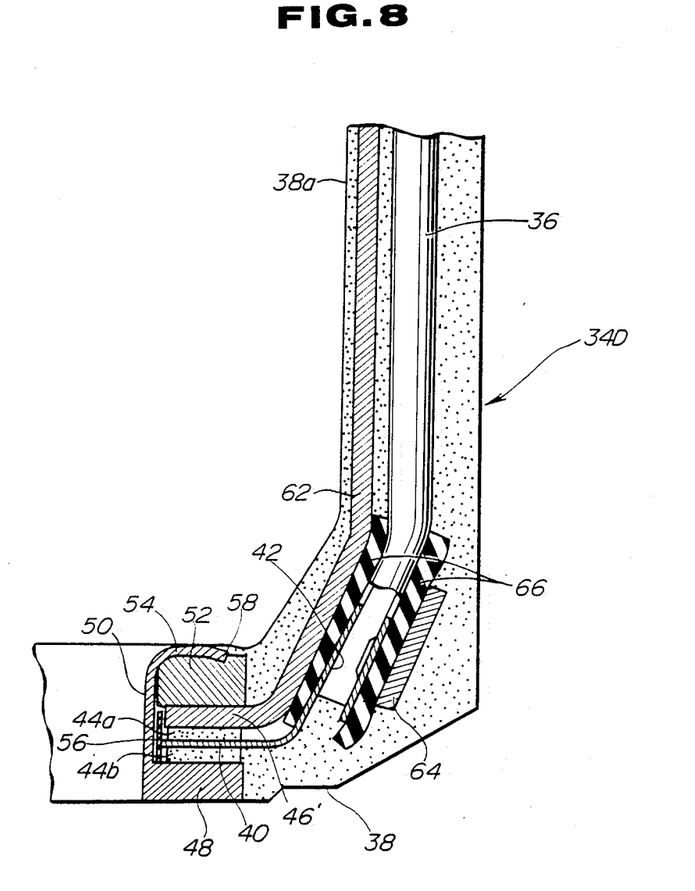
FIG. 8 is a fragmentary sectional view of a fifth embodiment of a piezoelectric pressure sensor.

FIG. 8 is a fragmentary sectional view of another embodiment of a piezoelectric pressure sensor 34D. This piezoelectric pressure sensor 34D is substantially the same as the piezoelectric pressure sensor 34A shown in FIG. 4 except that a pressure acting member 46' has a mast core portion 62 extending through a mast section 38a of an annular insulator body 38, and the mast core portion 62 has a sleeve 64 surrounding a portion where an output terminal 42 of an electrode 40 is connected to a core of a lead in the form of a shielded cable 36. This portion is surrounded by a protector tube 66 of an insulator and then fits into the sleeve 64. As a result, this portion where the output terminal 42 is connected to the core of the shielded cable 36 is securely held by the sleeve 64 via the protector tube 66 and thus it is securely protected.

Figure 9:
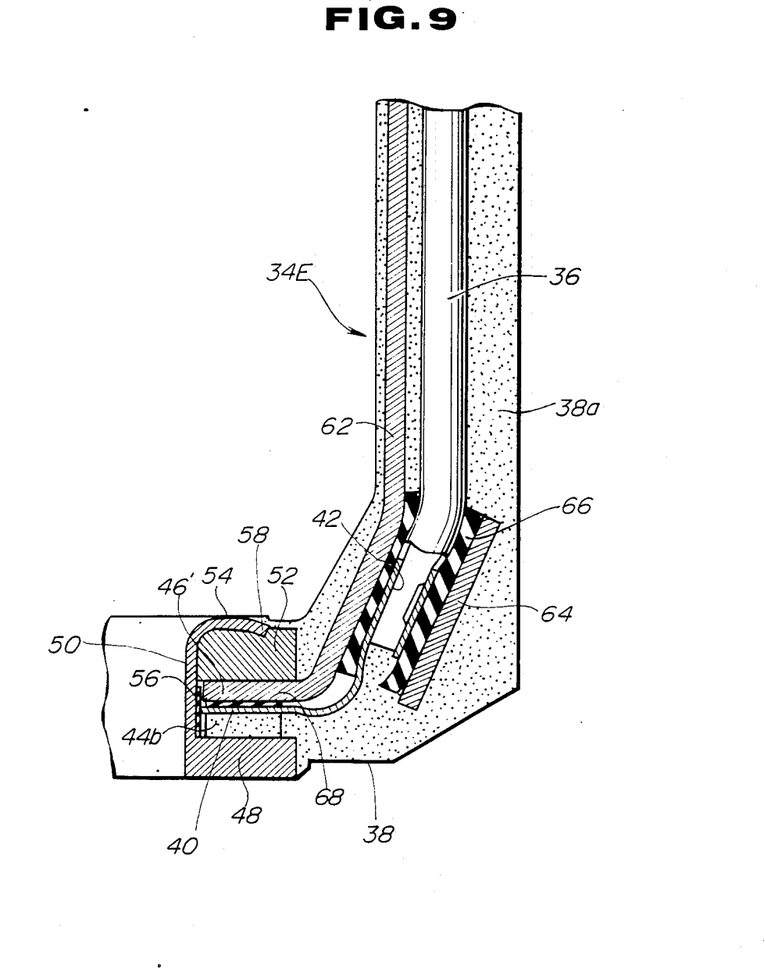
FIG. 9 is a fragmentary sectional view of a sixth embodiment of a piezoelectric pressure sensor.

FIG. 9 is a fragmentary sectional view of still another embodiment of a piezoelectric pressure sensor 34E.

This piezoelectric pressure sensor 34E is substantially the same as the piezoelectric pressure sensor 34D shown in FIG. 8 except that one 44a of the piezoelectric elements 44a, 44b has been replaced with an annular insulator member 68. This structure is advantageous in that the number of piezoelectric elements has been reduced to one. Besides, since the thickness of the annular insulator member 68 can be reduced, the total thickness of the annular section of the piezoelectric pressure sensor 34E can be made less than that of the piezoelectric pressure sensor shown in FIG. 8.

Figure 10:
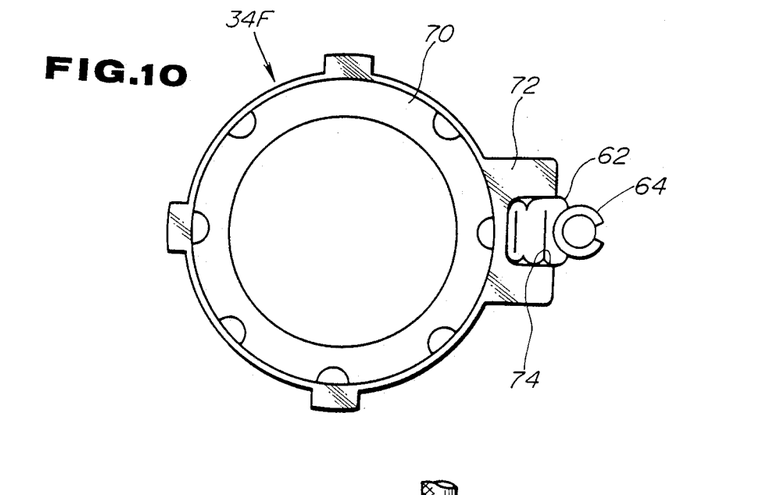
FIG. 10 is a plan view of a seventh embodiment of a piezoelectric pressure sensor with a molded insulator body removed to show the internal structure.
Figure 11:
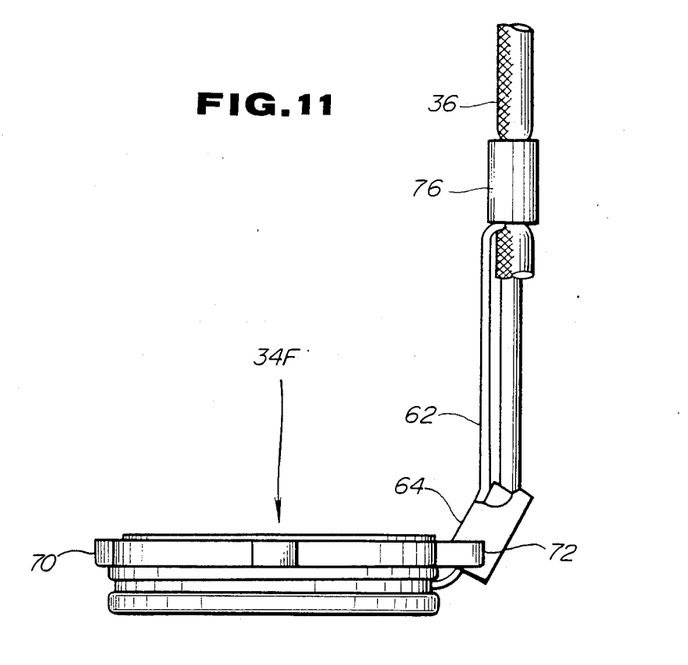
FIG. 11 is a side elevation of the seventh embodiment shown in FIG. 10.

Referring to FIGS. 10 and 11, still another embodiment of a piezoelectric pressure sensor 34F is described. In order to clearly show the structure, a molded insulator body has been removed in FIGS. 10 and 11. The structure is substantially the same as that shown in FIG. 8 or 9 except that the gasket 52 has been replaced with a gasket 70 which has a radial extension 72 formed with a slot 74 receiving therein a mast core portion 62 at a portion adjacent a protector sleeve 64. This arrangement is effective in preventing relative rotation occurring between the gasket 70 and the protector sleeve 64. As is best seen in FIG. 11, the mast portion 62 has at its end portion a second sleeve 76 holding a shieded wire 36.

Figure 12:
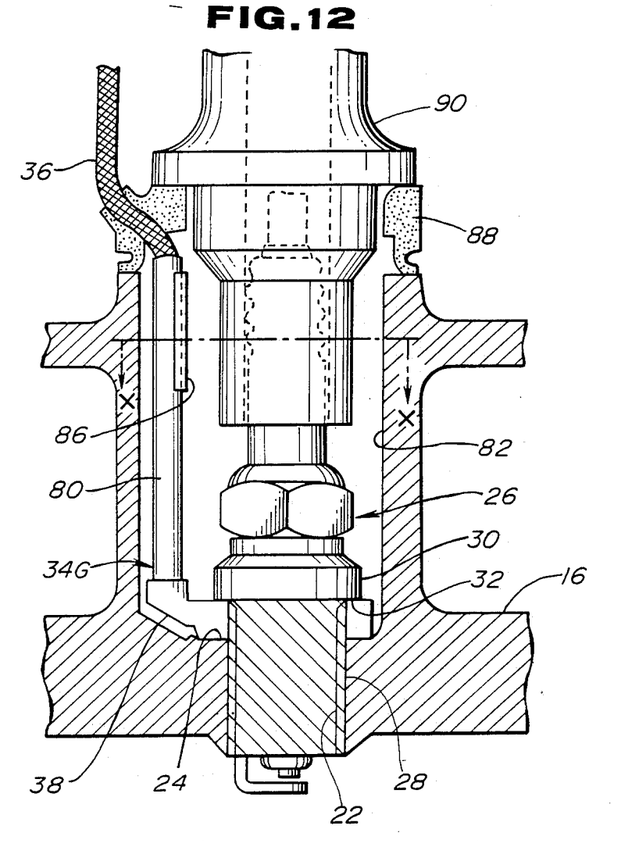
FIG. 12 is a fragmentary sectional view of an internal combustion engine of the type including a spark plug accommodation hole showing an eighth embodiment of a piezoelectric pressure sensor in its operative installed position.
Figure 13:
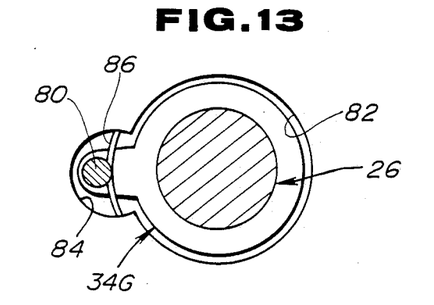
FIG. 13 is a cross sectional diagrammatic view taken through the line X—X of FIG. 12.

Referring to FIGS. 12 and 13, still another embodiment of a piezoelectric sensor 34G is described. This piezoelectric pressure sensor 34G is substantially the same as the piezoelectric pressure sensor 34F shown in FIGS. 10 and 11 except that instead of two separate sleeves 64 and 76, an elongate single sleeve 80 extends from an annular electrode, not shown, and serves as a mast portion. Another difference resides in that this elongate sleeve 80 is not covered with an insulator body. As shown in FIG. 12, the piezoelectric pressure sensor 34G is positioned in a spark plug accommodation bore 82 which has a guide groove 84 axially extending along the wall of the bore 82. The elongate sleeve 80 is held in the axially extending groove 84 by a resilient plate 86 fixed to an upper portion of the sleeve 80. As best seen in FIG. 13, this plate 86 is resilient so that it keeps frictional contact with the guide groove 84 defining wall. The elongate sleeve 80 extends up to a level slightly above the open end of the spark plug accommodation bore 82. Extending from this sleeve 80 is a lead 36. The lead 36 further extends outward through a seal 88 positioned between the open end of the spark plug accommodation bore 82 and a plug boot 90. When this elongate sleeve 80 is held in position in the axial groove 84 by means of the resilient plate 86, the piezoelectric pressure sensor 34G is positioned on a first wall 24 around a spark plug insert bore 22, thus making the installation easy.

Figure 14:
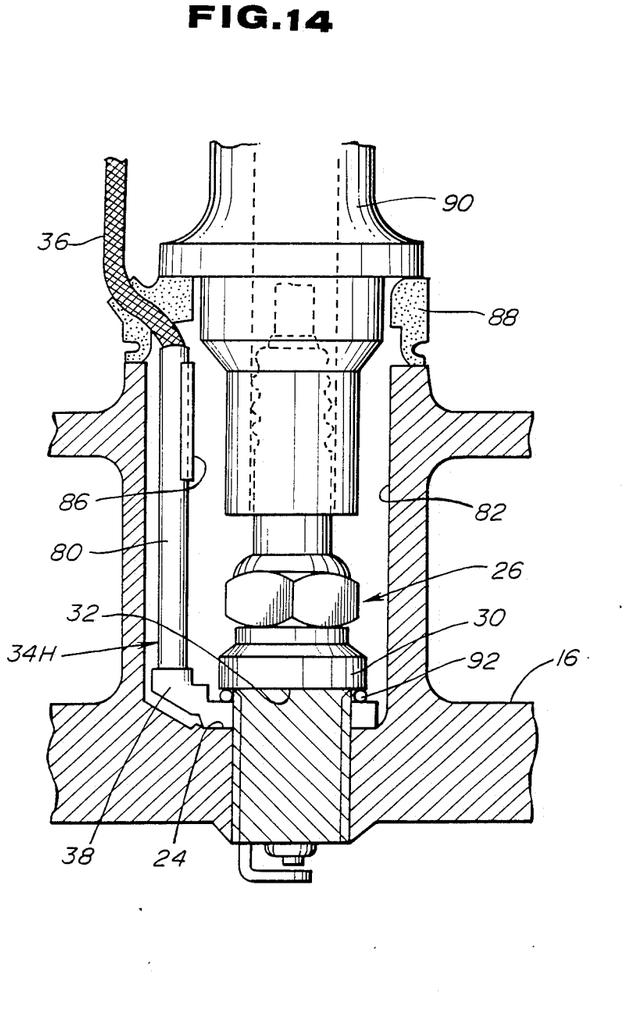
FIG. 14 is a similar view to FIG. 12 showing a piezoelectric pressure sensor using an external gasket.

FIG. 14 shows a modification 34H which is different from the embodiment shown in FIG. 12 only in the provision of an external gasket 92 rather than the internal gasket 52 as shown in FIG. 9.

Figure 15:
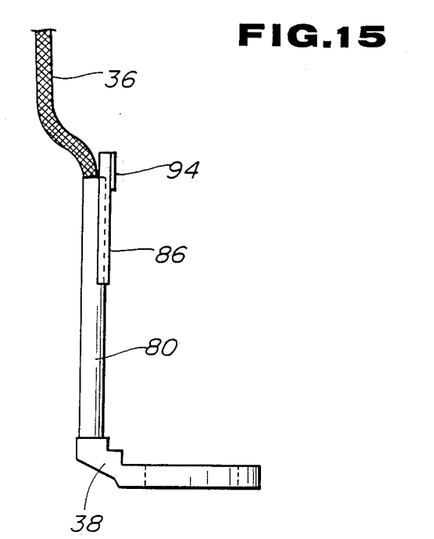
FIG. 15 is a side elevation of a modification of the piezoelectric pressure sensor shown in FIG. 14.
Figure 16:
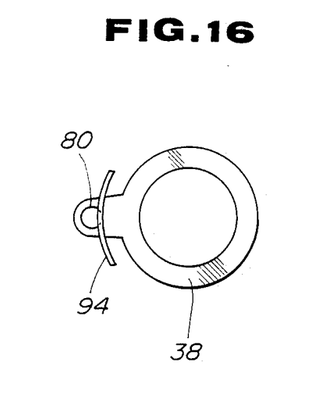
FIG. 16 is a plan view of the piezoelectric pressure sensor shown in FIG. 15.
Figure 17:
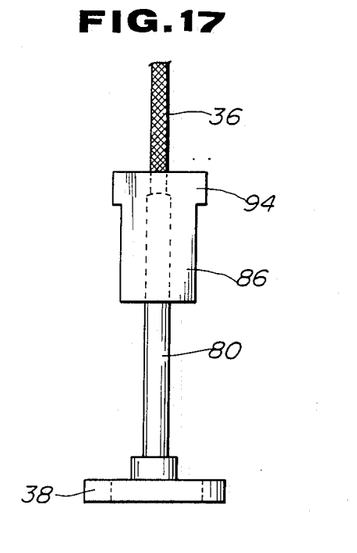
FIG. 17 is front elevation of the piezoelectric pressure sensor shown in FIG. 15.

Preferably, in order for increased accuracy in positioning of a piezoelectric pressure sensor in a depth direction of a spark plug accommodation bore, a stop 94 is fixed to an elongate sleeve 80 at an upper end portion of a resilient plate 86 as viewed in FIG. 15. The configuration of the stop 94 may be readily understood from FIGS. 15, 16 and 17. In positioning, the sleeve 80 is inserted deeply into a spark plug accommodation bore until the stop 94 abuts on the open end of the spark plug accommodation bore.

Figure 18:
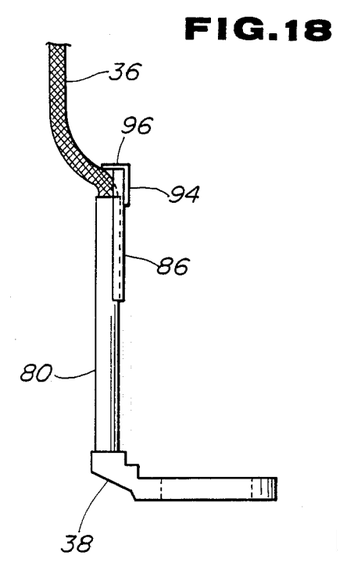
FIGS. 18, 19 and 20 are similar view to FIGS. 15, 16 and 17, respectively, and show a further modification of the piezoelectric pressure sensor.
Figure 19:
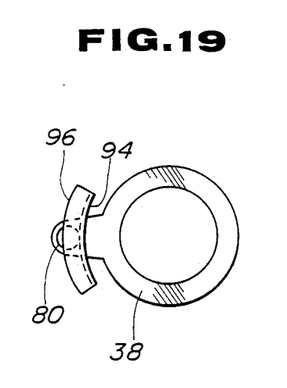
Figure 20:
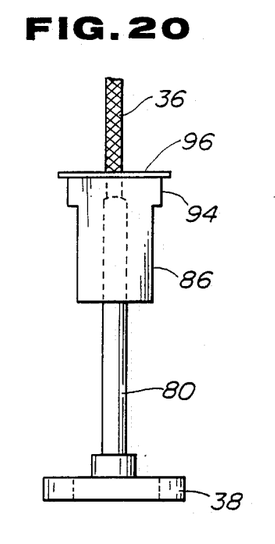

In order for facilitating the work of this positioning, a flange 96 extends from a stop 94 as shown in FIGS. 18, 19 and 20. Inserting work of a sleeve 80 till the abutting engagement of the stop 94 with the open end of a spark plug accommodation bore can be easily made by pressing down the flange 96.

In the previously described embodiment shown in FIG. 9, in order to insulate the inner periphery of the electrode 40 from the adjacent axially extending wall 50 of the pressure acting member 48, the insulator collar 56 and the annular insulator disk 68 are used. Since two separate insulator members 56 and 68, a difficulty is sometimes experienced in assembly.

Figure 21:
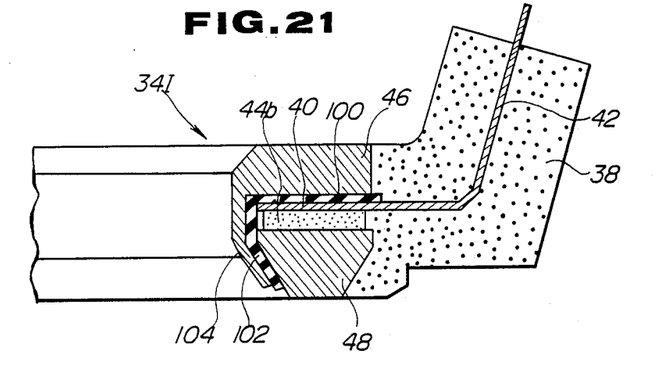
FIG. 21 is a fragmentary sectional view of another ninth embodiment of a piezoelectric pressure sensor.
Figure 22:
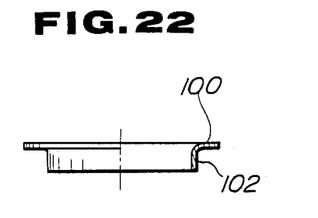
FIG. 22 is side elevation of an annular insulator disk integral with an insulator collar.
Figure 23:
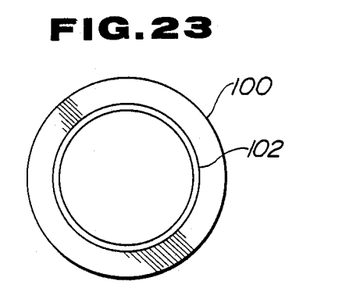
FIG. 23 is a top plan view of the insulator shown in FIG. 22.

FIG. 21 shows a fragmentary sectional view of still another embodiment of a piezoelectric pressure sensor 34I wherein the above mentioned difficulty has been solved. The above-mentioned difficulty has been solved by using an annular insulator disk 100 having an integral insulator collar 102 as best seen in FIGS. 22 and 23. As shown in FIG. 21, in this embodiment, an axially extending wall 104 extends from an upper pressure acting member 46 rather than a lower pressure acting member 48. An axial end of the axially extending wall 104 is pressed into conformity with the inner periphery of the pressure acting member 48 with an axial end portion of the insulator collar 102 interposed therebetween.

Figure 24:
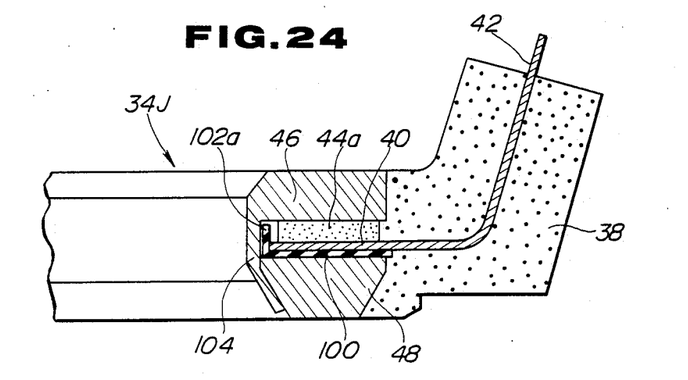
FIG. 24 is a fragmentary sectional view of a further embodiment of a piezoelectric pressure sensor.

FIG. 24 shows still another embodiment of a piezoelectric pressure sensor 34J which is substantially the same as the just mentioned embodiment shown in FIG. 21 except that an annular insulator disk 100 with a relatively short insulator collar 102a is used and an electrode 40 is separated from a pressure acting member 46 by a piezoelectric element 44a and separated from the other pressure acting member 48 by the insulator disk 100.

Since, in the embodiments shown in FIGS. 21 and 24, the insulator collar 102 or 102a is formed integral with the insulator disk 100, it is always positioned appropriately between the inner periphery of the annular disk-like electrode 40 and the adjacent axially extending wall 104, thus assuring insulation therebetween.

Figure 25:
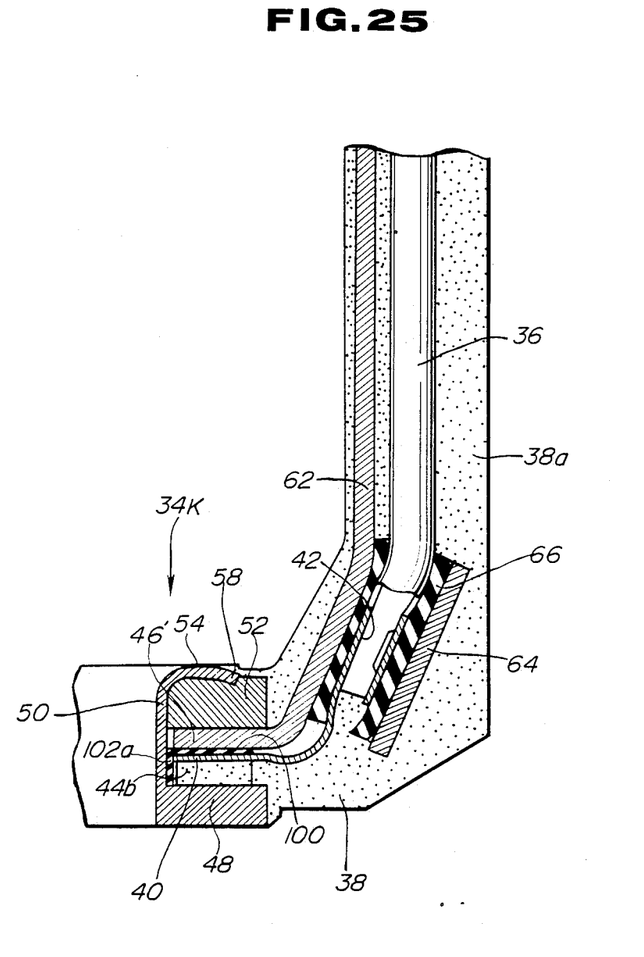
FIG. 25 is a fragmentary sectional view of a still further embodiment of a piezoelectric pressure sensor.

Referring to FIG. 25, there is shown an embodiment of a piezoelectric pressure sensor 34K which is different from the embodiment 34E shown in FIG. 9 only in the use of an annular insulator disk 100 integral with a collar 102a instead of two separate insulators 56 and 68.

What is claimed is:

1. A pressure measuring instrument for the measurement of combustion chamber pressure in the cylinder of an internal combustion engine, comprising:

a cylinder head formed with a spark plug insert bore having a female thread, said cylinder head including a first substantially flat wall extending radially outward from one axial end of said spark plug insert bore;

a spark plug including a portion having a male thread engaged with said female thread of said spark plug insert bore, and a second radially extending wall opposed to and spaced from said first wall of said cylinder head, a piezoelectric pressure sensor surrounding said portion of said spark plug and disposed between said first and second walls;

said sensor comprising an annular disk-like electrode with an output terminal, a piezoelectric element in contact with said electrode, a pair of annular pressure acting members having interposed therebetween said electrode and said piezoelectric element, and a lead;

one of said pair of annular pressure acting members having an axially extending wall disposed inward of the inner periphery of the other of said pair of annular pressure acting members; and a gasket disposed between said first and second radially extending walls, radially outward of said axially extending wall and on the other of said pair of annular pressure acting members, said axially extending wall being curved radially outward to form a terminal end portion holding said gasket on said the other of said pair of annular pressure acting members, one of said pair of annular pressure acting members being in abutting engagement with one of said first and second walls with said terminal end portion being in abutting engagement with the other of said first and second walls.

2. A pressure measuring instrument as claimed in claim 1, wherein said terminal end portion has peripheral portions engaged firmly into said gasket.

3. A pressure measuring instrument as claimed in claim 2, including electrical insulator means for providing insulation between said axially extending wall of said one of said pair of annular pressure acting members and the inner peripheries of said annular disk-like electrode and said the other of said pair of annular pressure acting members.

4. A pressure measuring instrument as claimed in claim 3, wherein said electrical insulator means takes the form of a tube having an axial end thereof firmly interposed between said axially extending wall and said gasket.

5. A pressure measuring instrument as claimed in claim 4, wherein said gasket has a protrusion extending radially outward in the same direction as said output terminal.

6. A pressure measuring instrument as claimed in claim 2, including an electrical insulator body having a mast section enclosing a connection where said output terminal of said electrode is connected to said lead.

7. A pressure measuring instrument as claimed in claim 6, wherein said the other of said pair of pressure acting members has a mast core portion extending through said mast section of said electrical insulator body, and said mast core portion of said the other of said pair of pressure acting members has a first sleeve surrounding said connection where said output terminal of said electrode is connected to said lead.

8. A pressure measuring instrument as claimed in claim 7, including a protector tube surrounding said connection and fitting into said sleeve of said mast core portion of said the other of said pair of pressure acting members.

9. A pressure measuring instrument as claimed in claim 7, including an annular insulator member disposed between said electrode and said the other of said pair of pressure acting members.

10. A pressure measuring instrument as claimed in claim 9, including an annular insulator disk having an integral insulator collar, and said annular disk is disposed between said electrode and said the other of said pair of pressure acting members with said integral collar positioned between said axially extending wall and the inner peripheries of said electrode and said piezoelectric element.

11. A pressure measuring instrument as claimed in claim 7, wherein said gasket has a radial extension formed with a slot receiving therein said mast core portion of said the other of said pair of pressure acting members.

12. A pressure measuring instrument as claimed in claim 11, wherein said mast portion of said the other of said pair of pressure acting members has a second sleeve holding said lead.

13. A pressure measuring instrument as claimed in claim 2, wherein one of said pair of pressure acting members has an elongate sleeve enclosing said lead.

14. A pressure measuring instrument as claimed in claim 13, including a resilient plate fixed to said elongate sleeve.

15. A pressure measuring instrument as claimed in claim 14, wherein said cylinder head includes means defining a spark plug accommodation bore which has a guide groove axially extending along the wall of said spark plug accommodation bore, and said piezoelectric pressure sensor is positioned in said spark plug accommodation bore, and wherein said elongate sleeve is received in said guide bore with said resilient plate kept in frictional contact with the wall of said guide groove.

16. A pressure measuring instrument as claimed in claim 15, including a stop fixed to said elongate sleeve at a portion adjacent to said resilient plate.

17. A pressure measuring instrument as claimed in claim 16, wherein said stop has a flange extending therefrom.

18. A pressure measuring instrument for the measurement of the combustion chamber pressure in a cylinder of an internal combustion engine, comprising:

a cylinder head formed with a spark plug insert bore having a female thread, said cylinder head including a first substantially flat wall extending radially outward from one axial end of said spark plug insert bore;

a spark plug including a portion having a male thread engaged with said female thread of said spark plug insert bore, and a second radially extending wall opposed to and spaced from said first wall of said cylinder head;

a piezoelectric pressure sensor surrounding said portion of said spark plug and disposed between said first and second walls;

said sensor comprising an annular disk-like electrode with an output terminal, a piezoelectric element in contact with said electrode, a pair of annular pressure acting members having interposed therebetween said electrode and said piezoelectric sensor and a lead;

one of said pair of annular pressure acting members having an axially extending wall disposed inward of the inner periphery of the other of said pair of annular pressure acting members; and an electrical insulator body having a mast section enclosing a connection where said output terminal of said electrode is connected to said lead.

19. A pressure measuring instrument for the measurement of the combustion chamber pressure in a cylinder of an internal combustion engine, comprising:

a cylinder head formed with a spark plug insert bore having a female thread, said cylinder head including a first substantially flat wall extending radially outward from one axial end of said spark plug insert bore;

a spark plug including a portion with a male thread engaged with said female thread of said spark plug insert bore, and a second radially extending wall opposed to and spaced from said first wall of said cylinder head;

a piezoelectric pressure sensor surrounding said portion of said spark plug and disposed between said first and second walls;

said sensor comprising an annular disk-like electrode with an output terminal, a piezoelectric element in contact with said electrode, a pair of annular pressure acting members having interposed therebetween said electrode and said piezoelectric element, and a lead;

one of said pair of annular pressure acting members having an axially extending wall disposed inward of the inner periphery of the other of said pair of annular pressure acting members; and an annular insulator disk having an integral insulator collar, said annular disk being disposed between said electrode and said the other of said pair of pressure acting members with said integral collar positioned between said axially extending wall and the inner peripheries of said electrode and said piezoelectric element.

20. A pressure measuring instrument for the measurement of the combustion chamber pressure in a cylinder of an internal combustion engine, comprising:

a cylinder head formed with a spark plug insert bore having a female thread, said cylinder head including a first substantially flat wall extending radially outward from one axial end of said spark plug insert bore;

a spark plug including a portion with a male thread engaged with said female thread of said spark plug insert bore, and a second radially extending wall opposed to and spaced from said first wall of said cylinder head;

a piezoelectric pressure sensor surrounding said portion of said spark plug and disposed between said first and second walls;

said sensor comprising an annular disk-like electrode with an output terminal, a piezoelectric element in contact with said electrode, a pair of annular pressure acting members having interposed therebetween said electrode and said piezoelectric sensor, and a lead;

one of said pair of annular pressure acting members having an axially extending wall disposed inward of the inner periphery of the other of said pair of annular pressure acting members; and an annular insulator disk having an integral insulator collar, said annular disk being disposed between said electrode and said one of said pair of pressure acting members with said integral collar positioned between said axially extending wall and the inner peripheries of said electrode and said piezoelectric sensor.

* * * * *